United States Patent
Bertin et al.

(10) Patent No.: US 9,155,067 B2
(45) Date of Patent: Oct. 6, 2015

(54) METHOD FOR ACTIVATING A COMMUNICATION TERMINAL

(75) Inventors: Philippe Bertin, Acigne (FR); Karine Guillouard, Chantepie (FR)

(73) Assignee: France Telecom, Paris (FR)

( * ) Notice: Subject to any disclaimer, the term of this patent is extended or adjusted under 35 U.S.C. 154(b) by 141 days.

(21) Appl. No.: 13/381,594

(22) PCT Filed: Jun. 29, 2010

(86) PCT No.: PCT/FR2010/051365
§ 371 (c)(1),
(2), (4) Date: Dec. 29, 2011

(87) PCT Pub. No.: WO2011/001108
PCT Pub. Date: Jan. 6, 2011

(65) Prior Publication Data
US 2012/0106398 A1  May 3, 2012

(30) Foreign Application Priority Data
Jun. 30, 2009 (FR) .................... 09 54476

(51) Int. Cl.
*H04W 4/00* (2009.01)
*H04W 68/04* (2009.01)
*H04W 92/00* (2009.01)

(52) U.S. Cl.
CPC .............. *H04W 68/04* (2013.01); *H04W 92/00* (2013.01)

(58) Field of Classification Search
None
See application file for complete search history.

(56) References Cited

U.S. PATENT DOCUMENTS

| 7,142,520 | B1* | 11/2006 | Haverinen et al. | 370/311 |
| 7,725,115 | B2* | 5/2010 | Venkatachalam | 455/458 |
| 7,991,409 | B2* | 8/2011 | Qi et al. | 455/458 |
| 8,730,911 | B2* | 5/2014 | Chan et al. | 370/331 |
| 2005/0272481 | A1* | 12/2005 | Kim | 455/574 |
| 2006/0058038 | A1 | 3/2006 | Das et al. | |
| 2007/0115873 | A1* | 5/2007 | Kim et al. | 370/318 |
| 2009/0201842 | A1* | 8/2009 | Guan | 370/310 |

(Continued)

FOREIGN PATENT DOCUMENTS

EP    1821561 A1    8/2007

OTHER PUBLICATIONS

English Translation of the International Preliminary Report on Patentability and Written Opinion dated Jan. 17, 2012 for corresponding International Application No. PCT/FR2010/051365, filed Jun. 29, 2010.

(Continued)

*Primary Examiner* — Anh-Vu Ly
(74) *Attorney, Agent, or Firm* — David D. Brush; Westman, Champlin & Koehler, P.A.

(57) ABSTRACT

A method and apparatus are provided for activating a communication terminal situated in a wireless communication network including a plurality of access nodes. The method includes: receiving, by an access node of the communication network, termed an anchor access node, at least one datum to be transmitted to the communication terminal; identifying, by the anchor access node, at least one access node to which the communication terminal was previously attached, termed a last known access node, on the basis of the datum to be transmitted; and transmitting to the at least one last known access node at least one activation datum destined for at least one communication interface of the terminal, making it possible to activate the terminal.

10 Claims, 4 Drawing Sheets

(56) References Cited

U.S. PATENT DOCUMENTS

2009/0219846 A1* 9/2009 Chan et al. .................. 370/311
2010/0226298 A1* 9/2010 Chan et al. .................. 370/311

OTHER PUBLICATIONS

International Search Report and Written Opinion dated Oct. 5, 2010 for corresponding International Application No. PCT/FR2010/051365, filed Jun. 29, 2010.

NEC: "IP Paging Functionality in SAE" 3GPP Draft; S2-051066, 3rd Generation Partnership Project (3GPP), Mobile Competence Center; 650, Route Des Lucioles; F-06921 Sophia-Antipolis Cedex; France, vol. SA WG2, no. Athens; May 4, 2005, XP050252612.

Ramjee et al., "IP Pageing Service for Mobile Hosts" Wireless Networks, ACM, New York, NY, US, vol. 8, No. 5, Sep. 1, 2002, pp. 427-441, XP001131425.

* cited by examiner

METHOD FOR ACTIVATING A COMMUNICATION TERMINAL

CROSS-REFERENCE TO RELATED APPLICATIONS

This Application is a Section 371 National Stage Application of International Application No. PCT/FR2010/051365, filed Jun. 29, 2010, which is incorporated by reference in its entirety and published as WO 2011/001108 on Jan. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of communications in communication networks, especially wireless communication networks.

The present disclosure pertains more particularly to the implementation of a process for searching for, discovering and activating terminals within such wireless communication networks, a process also called "Paging".

In a wireless communication network, the mobile terminals must generally be situated in proximity to an access node (AN for "Access Node") so as to be able to receive and send data. An access node is an item of equipment of the network which constitutes as it were an interface between the terminal and an access network, and whose coverage zone corresponds generally to a cell. The access network is divided up into location zones, comprising a set of cells. With a location zone is therefore associated a list of access nodes. These access nodes can implement different radio technologies. The cells of one and the same zone may be adjacent, overlap partially or totally, or else be disjoint. An access network thus consists of a plurality of access nodes, themselves grouped together in location zones.

Increasingly commonly, the wireless communication network is also called an access network. The access network makes it possible to access other networks, and in particular at least one network termed a core network. The wireless communication technology implemented in the access network may be for example GSM technology (for "Groupe Spécial Mobile"), or else WiFi technology. So-called "multi-access" networks exist however. These multi-access networks comprise a plurality of access nodes which implement different communication technologies. For example within the same multi-access network, WLAN (for "Wireless Local Area Network") access nodes and UMTS (for "Universal Mobile Telecommunication System") access nodes may be deployed in accordance with a single architecture. Each access node implements level-2 access node functions with reference to the layers of the OSI (for "Open Systems Interconnection") model allowing systems interconnection. It entails the establishment of a physical link (as is carried out by an access point or a radio base station for example). Each access node also implements functions for addressing and routing data packets (such as IP packets) which are level-3 access functions, with reference to the OSI model. The access nodes also implement functions related to mobility management. Thus, a multi-access network is composed of access nodes able to operate simultaneously or otherwise according to various technologies.

Within a multi-access network such as this, a multi-access terminal likewise exhibits several interfaces, which each correspond to a different technology. A terminal can have a GSM interface, a UMTS interface, a WiFi interface, etc. A multi-access terminal can implement several communication streams which are based on one or more IP addresses which are allocated to the terminal. Each stream uses one of the IP addresses of the terminal and is implicitly anchored on the router via which the IP address used by the stream has been allocated.

The disclosure pertains in particular to the search for and activation of multi-access terminals in a multi-access communication network, that is to say to a paging on a multi-access communication network. It can also be implemented in a single-technology access network which would not a priori, i.e. without an embodiment of the invention, be able to implement the mechanism of paging.

BACKGROUND OF THE DISCLOSURE

Within these multi-access networks, certain interface technologies are able to implement the mechanism of paging, that is to say the broadcasting of search requests for mobile nodes in a set of cells within which a terminal can move without signaling this explicitly to the network, that is to say in a location zone. A terminal not having any communications in progress can switch to a standby state and move within its location zone without the network knowing precisely in which cell it is situated. The objective of paging is to save the resources of the terminal and of the network (such as for example radio resources, the network signaling, etc.).

The terminal in the standby state merely listens to and interprets certain announcements of the network such as the paging requests and the broadcasting of location zone identifiers. This information is broadcast in a manner specific to each technology considered, for example by using dedicated logical channels. The terminal is required to update its location with each change of location zone, as well as in a periodic manner. Each location update involves exiting the standby state, to which the terminal can nonetheless return immediately afterwards. When the terminal receives a paging request intended for it, it implements a location updating procedure making it possible to locate it in its current cell. It therefore becomes located with enough precision so that the network can route the traffic intended for it.

However, not all technologies allow the implementation of the paging mechanism. In particular, "WiFi" wireless (802.11) technologies do not make it possible to implement this process. When the terminal moves between two 802.11 cells, it must therefore systematically become associated with the access point of the new cell which it is entering in order to remain reachable, even if it does not have any traffic session in progress.

Within the framework of multi-access networks, the problem of the saving of the resources of the terminal and network therefore persists, since not all technologies are suited to the implementation of the paging mechanism and it is consequently difficult for example to save the resources of a multi-access terminal in a multi-access network. The same holds in networks which implement only one technology (one then speaks of single-technology networks), when this technology does not allow the implementation of the paging mechanism.

Moreover, in a multi-access network, it is complicated to manage paging requests for each possible interface of the multi-access terminal, so that it is almost impossible for the latter to be placed in the standby state.

In order to expand paging mechanisms to multi-access networks and terminals, various works have been published. A new approach to paging for multi-access environments has in particular been proposed. Such an approach relies on the cooperation between the multi-access access networks and a centralized network element, called the "Paging Center". Two processes are provided for in this approach:

- a process based on registration "Registration based approach" in which the "Paging Center" maintains the state of the interfaces of the mobile terminals. To reach a terminal (NM), the network contacts the "Paging Center" which selects the access network to be used and can trigger the paging;
- a process which is not based on registration "Non registration based approach" in which the "paging center" triggers pagings "blindly" on one or more access networks so as to try to reach the terminal. When the terminal receives the paging, it selects one of the access networks to send its response to the "paging center".

Interface-based maintaining of the states of the mobile such as envisaged in this document poses at least two types of problems: it generates the use of complex location contexts (at the minimum, maintaining of one context per interface used on the terminal) as well as the use of signalings dedicated to each technology. Moreover, the "paging center" also poses scale-up problems: the "paging center" centralizing the data streams destined for the terminals on standby potentially becomes a point of congestion in the network, particularly when it involves managing several hundreds of thousands of terminals.

In the case of implementation of the approach which is not based on registration "Non registration based approach", the solution provided for by the aforementioned approach consumes an enormous amount of resources at the network level, this not being acceptable.

Moreover, the proposed approach does not afford any response to the problem posed by the technologies which are not able to implement the paging mechanism, such as WiFi technologies.

There therefore exists a requirement for a technique allowing the implementation of a paging mechanism, both in a single-technology network when the technology implemented in this network does not a priori allow the implementation of such a mechanism, and in a multi-access network in which at least one of the deployed technologies is not able to implement such a paging mechanism.

SUMMARY

An embodiment of the invention relates to a method for activating a communication terminal situated in a wireless communication network comprising a plurality of access nodes, According to an embodiment of the invention, such a method comprises:
- a step of receiving, by an access node of said communication network, termed the anchor access node, at least one datum to be transmitted to said communication terminal;
- a step of identifying, by said anchor access node, at least one access node to which said communication terminal was previously attached, termed the last known access node, on the basis of said datum to be transmitted;
- a step of transmitting, to said at least one last known access node, at least one activation datum destined for at least one communication interface of said terminal, making it possible to activate said terminal.

Thus, an embodiment of the invention makes it possible to activate the communication terminal in a targeted manner while mobilizing, for the search for the latter, only the access nodes to which the terminal was previously attached, doing so without distinction of the communication interface previously used by the communication terminal to attach itself to the last known access node.

The attachment of a terminal comprises on the one hand the establishment of a physical link between the terminal and the access node. This establishment of a link is called level-2 attachment (link), with reference to the layers of the OSI model, a model allowing systems interconnection. The attachment of the terminal on the other hand comprises the obtaining of one or more items of data allowing the addressing and the routing of data packets between the terminal and the access node. This obtaining is called level-3 attachment (network) with reference to the layers of the OSI model. The last known access node to which the terminal was attached is an access node with which the terminal has performed a level-2 attachment and a level-3 attachment.

An embodiment of the invention makes it possible not to have to worry, on the one hand about the current state of each interface of the communication terminal, and on the other hand about the manner in which the communication terminal will be activated. Indeed, this activation is handled by the terminal's last known access nodes. The anchor access node, which is also called the paging anchor, is charged with initiating and distributing, between the last known access nodes, the paging procedure, that is to say the search for, discovery and activation of the communication terminal. In the case of a single-technology wireless communication network which is not a priori able to implement a paging mechanism, as for example in the case of a WiFi network, an embodiment of the invention nevertheless makes it possible to carry out an activation of the terminal with the aid of the last access node to which the terminal was attached.

According to a particular embodiment of the invention, said step of identifying said at least one last known access node comprises:
- a step of obtaining an activation context of said communication terminal; and when said context indicates that said terminal is inactive:
- a step of recording in said anchor access node said at least one datum to be transmitted to said terminal;
- a step of searching, within an attachment database, for said at least one last known access node.

Thus, the anchor access node is in a position to determine the state of the terminal and to decide on initiation of the activation of the latter when it is inactive. Stated otherwise, in contradistinction to the technique of centralized management of paging, an embodiment of the invention makes it possible to delegate the task of initialization to access nodes of the communication network. The anchor access node knows that it must carry out the initialization of the paging when it notices that the terminal is inactive. The fact that the anchor access node can search for the last known access node within a database renders it autonomous and participates in the independence of the anchor access node in relation to a centralized entity.

An embodiment of the invention also relates to an access node of a wireless communication network. According to an embodiment of the invention, such an access node comprises:

means for receiving at least one datum to be transmitted to said communication terminal;

means for identifying at least one access node to which said communication terminal was previously attached, termed the last known access node, on the basis of said datum to be transmitted;

means for transmitting, to said at least one last known access node, at least one activation datum destined for at least one communication interface of said terminal, making it possible to activate said terminal.

According to another aspect, an embodiment of the invention also relates to a computer program comprising program code instructions for the execution of the activation method such as described above.

An embodiment of the invention also relates to a method for broadcasting a datum for activating a communication terminal situated in a wireless communication network. According to an embodiment of the invention, such a method comprises:

a step of receiving, within an access node, termed the last known access node, said activation datum originating from an access node of said communication network, termed the anchor access node, having previously received at least one datum to be transmitted to said communication terminal;

a step of searching, within an attachment database, for an item of information representative of a current attachment of said communication terminal;

a step of broadcasting at least one activation request comprising said activation datum, in a location zone in which said terminal is situated, when said search step indicates that said terminal is not attached to said last known access node.

Thus, an embodiment of the invention makes it possible to alleviate the complexity of managing the contexts of each interface of the communication terminal by leaving it to the access node to verify that the communication terminal is not attached. This therefore avoids launching a procedure to discover the terminal (paging) when the information in possession of the paging anchor is not in agreement with the information in possession of the last known access node, for example because the communication terminal has only just attached to the last known node. The paging procedure is therefore distributed between the anchor access node and the last access node or nodes known by this anchor access node. For technologies which do not innately support paging, an embodiment of the invention makes it possible to maximize the chances of activating the terminal by using the last known access node or nodes to activate the terminal.

According to a particular characteristic of an embodiment of the invention, said broadcasting step comprises a step of transmitting an activation request in respect of said terminal destined for at least one access node of said location zone with which said last known access node is connected.

Thus, the access node which receives the activation datum, which is the last known access node to which the terminal has been attached, is not the only one to participate in the search and activation of the communication terminal. The access node invokes the assistance of other access nodes. In at least one embodiment of the invention, the transmission step is carried out whatever the type of communication technology of said at least one access node of said location zone, with which said last known access node is connected. Thus the access nodes can, in the case of a multi-access network, implement different communication technologies. In this case, the broadcasting of the activation requests will be carried out with the aid of several different technologies and will multiply the chances of activating the communication terminal. When the communication network is based on a single technology which does not support paging, transmission to other access nodes of the communication network makes it possible to expand the communication terminal search zone.

An embodiment of the invention also relates to an access node of a wireless communication network. According to an embodiment of the invention such an access node comprises:

means for receiving at least one activation datum originating from an access node of said communication network, termed the anchor access node, having previously received at least one datum to be transmitted to a communication terminal;

means for searching, within an attachment database, for an item of information representative of a current attachment of said communication terminal;

means for broadcasting at least one activation request comprising said activation datum, in a location zone in which said terminal is situated, when said search step indicates that said terminal is not attached to said access node.

According to another aspect, an embodiment of the invention also relates to a computer program comprising program code instructions for the execution of the broadcasting method such as described above.

An embodiment of the invention also relates to a method for transmitting a notification for deactivating a communication terminal situated in a wireless communication network comprising a plurality of access nodes.

According to an embodiment of the invention, such a method comprises:

a step of receiving, by a current access node to which said terminal is attached, a deactivation notification;

a step of transmitting, by said at least one current access node, to an access node liable to transmit at least one datum to said communication terminal, termed the anchor access node, at least one datum representative of a change of state of said terminal;

a step of deleting the attachment of said terminal within said at least one current access node.

Thus, an embodiment of the invention makes it possible to notify not only the access node to which the communication terminal is attached, but also the access node or nodes which might wish to transmit data to the communication terminal. These access nodes may for example be access nodes which have previously transmitted data to the terminal. They could also be access nodes which envisage transmitting data to the terminal. Thus, even when being deactivated, the communication terminal remains reachable in the multi-access network.

An embodiment of the invention also relates to an access node of a wireless communication network. According to an embodiment of the invention such an access node comprises:

means for receiving a deactivation notification originating from a communication terminal attached to said access node;

means for transmitting, to an access node liable to transmit at least one datum to said communication terminal, termed the anchor access node, at least one datum representative of a change of state of said terminal;

means for deleting the attachment of said terminal.

According to another aspect, an embodiment of the invention also relates to a computer program comprising program code instructions for the execution of the transmission method such as described above.

An embodiment of the invention also relates to a method for processing a notification for deactivating a communication terminal.

According to an embodiment of the invention such a method comprises:

a step of receiving said notification for deactivating said terminal originating from at least one current access node to which said terminal is attached;

a step of storing at least one datum for identifying said at least one current access node;

a step of associating at least one identifier of said terminal with said datum for identifying said at least one current access node, delivering a datum representative of a last known access node for said communication terminal.

Thus, an embodiment of the invention makes it possible not to lose any information as regards the location of the communication terminal. Indeed, as the communication terminal is deactivated, it is not possible to determine its precise location. An embodiment of the invention makes it possible not to totally lose track of the terminal by associating with the latter the access node from which the deactivation notification is received. Thus, it will be possible, hereinafter, to initialize a paging procedure destined for this terminal.

An embodiment of the invention also relates to an access node of a wireless communication network. According to an embodiment of the invention, such an access node comprises:

means for receiving at least one notification for deactivating a communication terminal, originating from at least one current access node to which said terminal is attached;

means for storing at least one datum for identifying said at least one current access node;

means for associating at least one identifier of said terminal with said datum for identifying said at least one current access node, delivering a datum representative of a last known access node for said communication terminal.

According to another aspect, an embodiment of the invention also relates to a computer program comprising program code instructions for the execution of the processing method such as described above.

An embodiment of the invention also relates to a method for processing a datum for activating a multi-access communication terminal supporting at least two types of different communication technologies, characterized in that it comprises:

a step of receiving said activation datum by way of at least one first communication interface;

a step of verifying that said activation datum received is intended for said terminal; and a step of activating said terminal, by way of at least one second communication interface, different from said first interface, when said activation datum received is intended for said terminal.

Thus, an embodiment of the invention makes it possible not to worry about the state of each communication interface of the terminal. Indeed, the terminal merely receives an activation datum, and it is up to it to decide on the communication interface that it wishes to activate so as to toggle to an active state.

According to a particular characteristic of an embodiment of the invention, said step of activating said terminal comprises:

a step of attaching said terminal to at least one access node by way of said at least one second communication interface of said terminal;

a step of transmitting at least one update datum in respect of a location of said communication terminal destined for an access node identified with the aid of said activation datum.

Thus, the terminal switches to the active state by using the communication interface of its choice, which may be different from the interface which allowed it to receive the activation datum. The activated interface can correspond to the best available interface within the terminal and is not necessarily, as is the case in the prior art, the interface which was previously used to associate itself with the last known access node.

An embodiment of the invention also relates to a communication terminal. According to an embodiment of the invention, such a terminal comprises:

means for receiving an activation datum by way of at least one first communication interface;

means for verifying that said activation datum received is intended for it; and means for activating said terminal, by way of at least one second communication interface, different from said first interface, when said activation datum received is intended for said terminal.

According to a particular characteristic of an embodiment of the invention, said terminal furthermore comprises:

means for attaching said terminal to at least one access node by way of said at least one second communication interface of said terminal;

means for transmitting at least one update datum in respect of a location of said communication terminal destined for an access node identified with the aid of said activation data.

According to another aspect, an embodiment of the invention also relates to a computer program comprising program code instructions for the execution of the processing method such as described above.

In at least one embodiment of the invention, the activation datum which is transmitted to the terminal by way of the anchor access node and of the last known access node or nodes is an IP address. This IP address is encapsulated in a data packet transmitted on the communication network. This IP address is an address which was allotted to the terminal during a previous communication session and is known to the latter. Thus, to activate the communication terminal, an embodiment of the invention offers a solution which allows the terminal to determine the access node which invokes the transmission of data.

In the case of a multi-access network and of a multi-access terminal, the use of an IP address of the terminal also allows the latter to determine the communication interface which was used to obtain this IP address. Thus, the terminal is in a position to choose the communication interface to be used to reactivate itself, which interface exhibits the greatest number of characteristics in common (in terms of throughput for example) with the access node from which the IP address was obtained.

BRIEF DESCRIPTION OF THE DRAWINGS

Other characteristics and advantages will be more clearly apparent on reading the following description of a preferential embodiment, given by way of simple illustrative and nonlimiting example, and the appended drawings, among which.

DETAILED DESCRIPTION OF ILLUSTRATIVE EMBODIMENTS

Figure 1A:
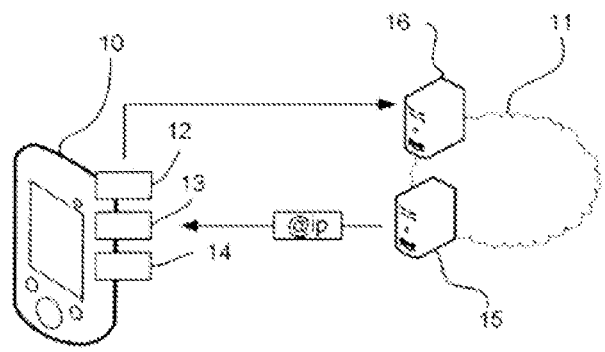
FIG. 1A presents a schematic of an embodiment of the activation and deactivation method of an embodiment of the invention in the case of a multi-access network and of a multi-access terminal.

1. Reminder of the Principle of an Embodiment of the Invention

An embodiment of the invention proposes clever and optimal management of paging in multi-access networks as well as in single-technological networks which do not comprise such a paging mechanism, by allowing distribution of paging to certain access nodes of the network. Accordingly, an embodiment of the invention relies in particular on two characteristics which are, on the one hand, the allotting of a single state to the terminal, whatever the number of interfaces that it counts, and on the other hand, the delegating of the paging function to certain entities of the access network.

An embodiment of the invention relies on the management of two states for the terminal: active and passive, whatever the number of technologies used by the terminal. Either the terminal is associated with the network on a given cell and it is considered to be active, or it moves in a location zone without its location being known precisely and it is in the passive state. According to an embodiment of the invention, a terminal some of whose interfaces are on standby at the radio level while at least one interface is active is in the active state for the network.

According to a particular embodiment of the invention, the current state of each terminal is recorded in a specific access node, termed the anchor access node, from which the terminal has previously obtained an address, for example an IP address. According to an embodiment of the invention, at least some of these anchor access nodes are able to trigger the paging, that is to say the terminal search mechanism which will make it possible to locate it and therefore to make it toggle to the active state so that it can receive and transmit data. According to an embodiment of the invention, this paging is distributed to the anchor access nodes which can implement it. This mechanism of paging by the anchor access node is specific to an embodiment of the invention and is described in detail hereinafter.

In a general way, an embodiment of the invention comprises two phases: a phase of activating the terminal when the latter is inactive (or passive, this term being synonymous with inactivity in respect of an embodiment of the invention) and a deactivation phase in which the terminal switches from an active state to an inactive state. These two phases are disjoint and may be implemented independently. During these two phases, an embodiment of the invention uses the services of several access nodes, according to a method detailed hereinafter, in order to, on the one hand, construct and transmit a request to activate the terminal and, on the other hand, relay and take into account a notification for deactivating a terminal at the level of the appropriate access nodes. The management of the activity state of the terminal (active/inactive) is therefore, according to an embodiment of the invention, ensured in a distributed manner by using the access nodes of the communication network, whether the latter is multi-access or single-technology.

The general principle of an embodiment of the invention is described more precisely in conjunction with FIG. 1A in the case of a multi-access access network. A multi-access terminal 10 comprises various interfaces for access to the access network 11: for example a GPRS interface (12), a UMTS interface (13) and a WiFi interface (14). When the terminal 10 wishes to transmit or receive data, for example by using the UMTS interface 13, it obtains, by way of an access node AN 15, an IP address. This IP address is recorded within the access node 15. According to an embodiment of the invention, this access node 15 also records the state of the terminal and ensures the anchor access node function. As the terminal has obtained an IP address and since it transmits/receives data by passing through this access node, this terminal 10 is considered to be active.

During its deactivation, that is to say during a switch to passive mode (that is to say the terminal no longer needs to transmit data, whatever the interface), the state of the terminal 10 is, according to an embodiment of the invention, notified within the anchor access node 15, which records the switching of the terminal 10 from the active mode to the passive mode and the location of the terminal in the access network 11 is no longer known by the latter. The transmission of the change of state of the communication terminal 10 to the anchor access node 15 may be carried out by way of another access node 16 to which the terminal has in the meantime attached, for example with the aid of its GPRS interface 12.

Subsequently, when for example the anchor access node wishes to transmit data to the terminal 10, it is first necessary to search for, discover and activate the terminal in the network so that it can attach itself to a new access node. According to an embodiment of the invention, prior to this attachment, a search is undertaken for at least one known access node from which the terminal has previously received data or to which it has previously transmitted data, doing so whatever the interface used previously. In this example, this search makes it possible to determine that the last known access node is the access node 16. The anchor access node 15 therefore proceeds, according to an embodiment of the invention, to the initialization of the paging operation, which is carried out by the access node 16 by way of the GPRS interface 12. According to the prior art techniques, on the contrary such an initialization would be carried out by way of the UMTS interface 13.

Thus, an embodiment of the invention has made it possible to carry out paging, while not requiring, on the one hand, the use of a centralized entity of the communication network, and on the other hand, while exploiting the multiple interfaces available to the terminal, so as not to have to carry out an interface-based paging of the terminal.

Figure 1B:
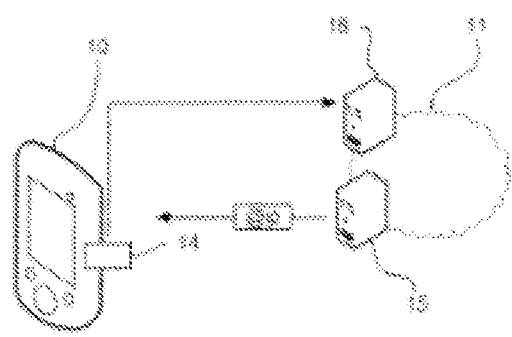
FIG. 1B presents a schematic of an embodiment of the activation and deactivation method of an embodiment of the invention in the case of a single-technology access network which does not provide for any terminal search, activation and discovery mechanism.

The general principle of an embodiment of the invention in the case of a single-technology access network which does not comprise, innately, any mechanism for searching for, discovering and activating communication terminals is presented in conjunction with FIG. 1B.

A multi-access terminal 10 comprises an interface for access to a single-technology access network 11: for example a WiFi interface (14). When the terminal 10 wishes to transmit or receive data, using the WiFi interface 14, it obtains, by way of an access node AN 15, an IP address. This IP address is recorded within the access node 15. According to an embodiment of the invention, this access node 15 also records the state of the terminal and ensures the anchor access node function. As the terminal has obtained an IP address and since it transmits/receives data by passing through this access node, this terminal 10 is considered to be active.

During its deactivation, that is to say during a switch to passive mode (that is to say the terminal no longer needs to transmit data, through any interface whatsoever), the state of the terminal 10 is, according to an embodiment of the invention, notified within the anchor access node 15, which records the switching of the terminal 10 from the active mode to the passive mode and the location of the terminal in the access network 11 is no longer known by the latter. The transmission of the change of state of the communication terminal 10 to the anchor access node 15 may be carried out by way of another access node 16 to which the terminal has in the meantime attached.

Subsequently, when for example the anchor access node wishes to transmit data to the terminal 10, it is first necessary to search for, discover and activate the terminal in the network so that it can attach itself to a new access node. According to an embodiment of the invention, prior to this attachment, a search is undertaken for at least one known access node from which the terminal has previously received data or to which it has previously transmitted data. In this example, this search makes it possible to determine that the last known access node is the access node 16. The anchor access node 15 therefore proceeds, according to an embodiment of the invention, to the initialization of the paging operation, which is carried out by the access node 16 by way of the WiFi interface 14. According to the prior art techniques, on the contrary, such an initialization would not have been possible since the access node would have been permanently connected to one of the access nodes 15 or 16.

The mechanisms which make it possible to place on standby a communication terminal which implements a technology which does not innately comprise any activation/deactivation mechanism are described hereinafter.

The paging mechanisms distributed according to an embodiment of the invention, in which the initialization of the paging is carried out by a mobility anchor, are also presented in detail hereinafter. A mobility anchor is an access node of the access network which is used to route the data to a terminal. This mobility anchor receives, from entities of the communication network, data to be transmitted to the terminal. The mobility anchor records the IP address that the terminal has previously acquired from it for the transmission of these data.

It is very obvious that the embodiment presented hereinafter is not limiting and that it is entirely conceivable to entrust the paging initialization function to an entity other than the mobility anchor, as was described in FIGS. 1A and 1B, on condition that this other entity has a knowledge, according an embodiment of to the invention, of the current access nodes visited by the terminal prior to its switch to the "passive" state (to its deactivation) and that this entity is capable of contacting the current access nodes visited so as to transmit a terminal search request to them.

The terminal's change-of-state mechanisms as well as the inventors' clever process to allow the support of paging by interfaces and protocols which do not innately permit these mechanisms, such as for example WiFi (standard 802.11), are also presented hereinafter.

2. Location Zones

It is considered that, in a location zone, all the access nodes can take part in the mechanism for activating a terminal deactivated according to an embodiment of the invention. For technologies not implementing paging, the use of the deactivation mechanism will not avoid the radio attachment of the terminal onto its current access node. However, according to an embodiment of the invention, attachment must make it possible to limit signaling by avoiding the update of location in the network. The terminal on standby can therefore, according to an embodiment of the invention, merely attach itself at level-2 to an access node without declaring its current position to the network. Its network contexts (for example the mobility anchors) are not modified. The terminal thus remains in the passive state but is able to receive the messages of router announcements or of address resolution ARP requests (Address Resolution Protocol, RFC 826) broadcast by the access node on its radio interface. The interface of the terminal must therefore be slightly modified, according to an embodiment of the invention, to attach itself as economically as possible, that is to say without declaring its current position and without changing its network contexts.

A terminal moving in the network must know the location zone in which it is situated. The location zone identifier must be broadcast by each access node, received and processed by each terminal, in particular in standby mode, when the terminal is passive (that is to say inactive).

In the case of technologies which comprise a mechanism for searching for, discovering and activating the terminals, the announcement of the identifier of the current zone is already provided for. In the case of technologies which implement interfaces which do not comprise such a mechanism, an embodiment of the invention makes provision to add, in at least one embodiment, information, either at the level of the level announcement messages 2 when this is possible, or in the level-3 router announcements. The relevant levels 2 and 3 pertain to the layers of the OSI model allowing systems interconnection.

On the interfaces which do not comprise any paging mechanism, the terminal will therefore have to be able to decode these announcement messages. Another solution for the technologies which do not comprise any paging mechanism consists in providing for an information service MIH (IEEE standard 802.21) in the access node. The terminal on standby which attaches itself to such an access node subscribes to this information service systematically, thereby allowing it to receive the location zone information from the access node.

The location zone identifier must be unique in the heterogeneous network considered. Its use in various technologies can lead to the implementation of minor modifications of each radio interface so as to broadcast the global zone identifier in place of the standardized identifier for radio technology. According to one embodiment of the invention, the identifier construction is similar to that implemented in GSM and aggregates a country identifier, a network identifier and a location zone number.

Each access node is able to implement the broadcasting of a search request (paging) to the other access nodes of its location zone. The implementation is specified in the following paragraphs.

3. States of the Terminal

Mobile terminals can implement several different technology interfaces (2G/3G, WiFi, etc.). In the approach of an embodiment of the invention, it is considered that the management of the mobility and of the reachability of a multi-interface mobile can be done in a global manner for all its interfaces, through the distribution of these functions into the mobility anchors. The mobility anchors therefore support the paging function. When it fulfills this function, the mobility anchor is also dubbed paging anchor. This therefore avoids interface-based management at the network level of a mobile's state (active/passive, etc.), such as provided for in the paging solution of the prior art, which requires complex management of the connectivity of the mobile. It is important to note that the paging anchor function can readily be carried out within entities other than the mobility anchor. The implementation presented here is offered merely by way of indication.

In order to allow the implementation of an effective and simple mechanism, the inventors have decided to manage in the network only two states per mobile:

Active: the terminal is located in at least one cell of the network, i.e. it is attached to one (or several) access nodes. The knowledge of this attachment is distributed in the network through its access nodes and its mobility anchors so as to be able to reach it so as to deliver the incoming traffic (establishment of new sessions or data packets).

Passive: the terminal is present in a location zone (a set of cells) but its precise location in the zone is not known by the network. In order to be able to send or receive traffic, the terminal must toggle into the active state. To reach the terminal when it needs to, the network generates, according to an embodiment of the invention, the sending of search requests (paging) in respect of the terminal in the location zone so as to prompt the terminal to locate itself and toggle into the active state.

Thus, from the moment the terminal is attached to the network on at least one interface, it is considered to be active, whatever the state of its other interfaces (detached or in standby mode).

According to an embodiment of the invention, the paging is not triggered for an active terminal since it is reachable on at least one interface. However, it is up to the terminal to trigger additional locations on its other interfaces if it wishes to redirect the traffic to the latter. The terminal must coordinate the management of its global state (active/passive) with the management of the states of its interfaces (active, standby, disassociated, etc.). The possible states of each interface are specific to the latter's radio technology.

The contexts of a terminal are, in at least one embodiment of the invention, maintained at the level of the anchor nodes and access nodes of the network. These contexts may be managed with the aid of two tables:

Each anchor node maintains a database of the terminals for which it is a mobility anchor: the AAN table. This table comprises for each terminal anchored in the node: the IP address of the terminal for which the anchor is activated, the associated lifetime, the IP address of the access node or nodes on which the terminal is reachable (the visited current access nodes or VAN for "Visited Access Node") and a state indicator of the mobile (0=mobile passive, 1=mobile active). For each passive terminal the datum "visited current access node" indicates the last known access node on which the terminal was located when it declared that it switched to the passive state.

Each access node maintains a table of the terminals which are attached to it: the VAN table. This table lists for each terminal the IP addresses used by the terminal, thereby allowing the access node to determine the list of anchor nodes of the terminal on the basis of the prefixes of the IP addresses.

According to an embodiment of the invention, each access node on which a terminal attaches itself can be used both as access node and as anchor node. The principle of paging management according to an embodiment of the invention relies on distributing the state of the mobile between its anchor nodes by recording the address of the last visited current access node(s), which are the last known nodes.

A terminal in the active mode may be induced to move in the network and to modify its attachments to the access nodes. The network takes these changes into account and updates the corresponding AAN and VAN contexts during changes such as detachment of the mobile from an access node or attachment to a new access node. These events may be the consequence of handovers, activation or deactivation of a radio interface, a loss of coverage, etc.

In order to allow the uploading of events from the terminal to the network, the inventors have had the idea of using MIH functions and primitives defined in IEEE standard 802.21. The use of MIH makes it possible to envisage its implementation on several different radio technologies. As an alternative, it is also possible to envisage defining a new signaling protocol specifically related to the implementation of a paging mechanism according to an embodiment of the invention.

4. Terminal Identifier Used for Paging

In order to identify the terminal searched for during the paging procedure according to an embodiment of the invention, a unique global identifier is necessary, usable whatever the technology or technologies of the interfaces of the terminal. It is possible, initially, to use an IP address as identifier. This requires adaptation of the paging mechanism for the radio interfaces which implement this mechanism: instead of broadcasting an identifier specific to the technology (the TMSI, "Temporary Mobile Subscriber Identity" for example for cellular situations), the paging request must allow the broadcasting of the IP address sought.

The use of the IPv4 or IPv6 address has several advantages:
the global IP address is unique. If necessary it is possible, in a restricted domain (an operator network for example), to envisage the use of a private addressing mechanism, the IP addresses are not global but remain unique in the domain considered and therefore usable to identify the terminal sought;
each terminal can at any moment have several activated IP addresses. It will have to attach itself subsequent to a paging procedure performed with one of these addresses.

A terminal is reachable by the network only if it has at least one active IP address. At the level of a mobility anchor, the expiry of a timeout measuring the duration of inactivity of the terminal causes the deactivation of this address, the consequence of which is that the terminal can no longer be reached using this address. The terminal must therefore be certain of controlling the updates of the contexts that it judges necessary in order to be reached. If it has no transport connections in progress (TCP, "Transport Control Protocol") on a given IP address, it can let the validity of this address expire. On the other hand if it wishes to be reachable upon the establishment of new sessions on one of its IP addresses, it must keep this address and the associated contexts live. For example if the incoming services (establishment of communication destined for the mobile node) rely on the use of the SIP ("Session Initiation Protocol") session establishment protocol, the terminal must ensure that one of its up-to-date addresses is properly declared in the SIP servers. The SIP servers record the correspondence between the identifier of the user (URI SIP) and the current IP address. During the establishment of an SIP call, the network thus performs a resolution mechanism allowing it to recover the IP address of the terminal that has to be used for the call signaling. This IP address is then routed automatically to the mobility anchor which is able to determine the state of the mobile (active or passive) and therefore to trigger the initialization of the paging with this IP address as identifier if the terminal is in the passive state.

5. Toggling of the Terminal to the Passive Mode

The switch from the active state to the passive state is triggered when the terminal is not currently sending or receiving data traffic and wishes to save energy. This can be done for example when the application sessions in progress terminate or else when the terminal has observed a period of inactivity for a predetermined time (no sending or receiving of IP packets).

In the passive mode (inactive), the state of the terminal is maintained at the level of the AAN contexts of the paging anchors whereas the VAN contexts of the current access nodes are deleted. When toggling from the active mode to the passive mode, it is therefore necessary to update the AAN contexts which are maintained in the paging anchors while ensuring deletion of the VAN contexts which are maintained in the current access nodes. The principle relies on distributing the functions between the terminal, the access nodes to which it is attached and its paging anchors. When the terminal toggles to the passive state, it notifies this to its current access nodes by sending a specific message, a deactivation notification, based for example on sending an MIH primitive. Given that such a primitive is not fully provided for by this standard, the inventors have had the idea of using the "link_down indication" primitive with a new "ReasonCode" specific to the management of terminal standby.

Each access node takes into account the new state of the mobile by propagating the information about toggling to the passive mode for each paging anchor of the terminal. Through its VAN table, the current access node ascertains the list of IP addresses used by the terminal and deduces therefrom the IP addresses of the paging anchors. It sends each of the paging anchor nodes a datum representative of a change of state of the terminal, which is for example a specific data packet regarding change of state of the mobile. This packet is for example an empty data packet whose source and destination addresses correspond to the mobile's address acquired under the anchor concerned. It is encapsulated from the current access node to the paging anchor by using another data packet, which comprises the address of the current access node and the address of the paging anchor.

Other protocols for signaling between visited current access node and paging anchor may also be envisaged. When the paging anchor receives the indication of switch to passive mode, it undertakes the updating of its AAN table: it positions the mobile's state indicator to "passive", erases the list of current access nodes and records the address of the current access node which transmitted the toggling information to it. If several access nodes upload the indication regarding toggling to passive mode, the paging anchor maintains the passive state for the terminal and records the addresses of the various current access nodes in its list.

Once the toggling of state has been notified to the paging anchors, the current access node deletes the corresponding VAN context. The terminal is then passive, it is able to move in its location zone while avoiding updating its location on each change of cell.

Prior to the toggling to the passive mode, a multi-interface terminal connected to several access nodes simultaneously can choose to deactivate (or detach from the network) some of its interfaces so as, for example, to declare the switch to passive mode only when it has just a single active interface. This can make it possible to avoid simultaneously transmitting several indications regarding toggling to the passive mode through the various interfaces.

6. Implementation of Paging

Paging is triggered, according to an embodiment of the invention, when the network receives packets destined for an inactive terminal. This occurs at the level of the mobility anchor in charge of transferring these packets (i.e. of the anchor of the IP address of the mobile for which these packets are intended).

The packets received destined for a passive mobile are recorded in a temporary memory by the mobility anchor during the paging procedure. The anchor knows the IP address of the access node (or of the access nodes) on which the terminal has toggled to the passive state: it is the last known access nodes which were recorded previously. The last known access nodes are capable of initiating the paging requests in the zone of location of the terminal.

The mobility anchor is therefore able to determine which access node to use to implement the paging; if several access nodes are recorded in its AAN table, the anchor must select one or more access nodes to be used. If it selects several, it multiplies the paging requests and therefore the associated signaling while increasing its chances of reaching the terminal at the earliest.

Subsequently, the access nodes which are charged with the implementation of the paging by the paging anchor are denoted ANp so as to distinguish them from the other nodes.

The paging anchor triggers the procedure by constructing an activation datum intended for the terminal, like an empty packet destined for the terminal. This activation datum is encapsulated so as to send it to the access node(s) ANp concerned (packet "tunneled" between the anchor and the access node ANp). On receipt of this packet, the access node ANp decapsulates it and notes that it is destined for a terminal absent from its VAN table. It must therefore trigger the broadcasting of paging requests in the whole of the location zone.

Another solution would consist in using an explicit signaling protocol to send a paging triggering request from the mobility anchor to each access node ANp, notifying them of the need to trigger the paging by indicating the identifier of the target terminal.

The paging request broadcast in the location zone by an access node ANp is a multicast request which uses a multicast group address pre-established by configuration in the network. The access node ANp constructs the multicast packet destined for the multicast group of its zone, in which it encapsulates the packet received from the paging anchor (or quite simply the IP address used as identifier of the target terminal). The multicast packet is then broadcast to the whole group (all the ANs of the location zone).

Another approach can consist in not using multicast on condition that the access node ANp has the list of addresses of the ANs neighboring its location zone. It can then use an explicit signaling protocol and send specifically 1 request unicast packet destined for each of the access nodes of its zone.

Each access node receiving the search request realizes that it is a matter of a paging packet on receipt of the multicast packet (or else of an explicit signaling request sent by the ANp). It recovers the identifier of the terminal sought and broadcasts a search request for the mobile node on the radio cell.

At each access node (including the ANp), the broadcasting of the paging on its radio cell (or cells) is triggered in accordance with a mechanism specific to the radio technology of the access node:
  either by the sending of an explicit paging message such as supported by the radio interface. The identifier used is the IP address of the mobile (case No. 1);
  or by the sending of an ARP request if the interface does not explicitly support paging (case No. 2).

The terminal which receives a message corresponding to paging implements its location updating procedure:

in case No. 1 (technology supporting the broadcasting of paging messages), the terminal receives the paging request through a signaling channel broadcast by the access node while it has no current level-2 attachment since it merely interprets these broadcast signaling elements. It must therefore, in order to locate itself in the network, begin by attaching itself at the radio level to one of the cells in which it is situated. It does not necessarily attach itself to the cell on which it has received the paging request since it may be that another cell of identical or different technology corresponds better to its selection criteria.

In case No. 2 (technology not comprising any paging mechanism), the terminal responds to the ARP request. It thereafter sends the location update requests destined for its mobility anchors, comprising in particular the paging anchor. These requests may be sent, according to an embodiment of the invention, to access nodes of different technologies, i.e. by using a different interface from that which received the ARP request.

In both cases, the terminal can also choose to locate itself simultaneously on several access nodes through its various access interfaces.

On receipt of the terminal location update:

Each mobility anchor updates its AAN table by recording the new active state and the address of the new AN on which the terminal is again located.

The paging anchor, in addition to the updating of its AAN table, undertakes the transfer of the packets intended for the mobile through the new current access node (packets placed in buffer memory during the paging procedure).

During the paging procedure the search and update packets may be lost, a retransmission mechanism is therefore provided for. At the level of the paging anchor, a paging triggering packet retransmission timeout and a retransmission counter are used: the timeout and the counter are initialized on the sending of the first paging packet to an ANp. The initialization values are parametrized by configuration. On receipt of the terminal location update, the procedure is terminated and the countdown of the timeout and of the counter are stopped. When the timeout expires while the update packet has not been received: if the retransmissions counter is not zero the paging packet(s) is (are) retransmitted while the timeout is reinitialized and the counter is decremented; otherwise the procedure is stopped, the terminal is then unreachable. Its location contexts are erased and the packets which are intended for it are lost.

7. Exemplary Implementation

Figure 2:
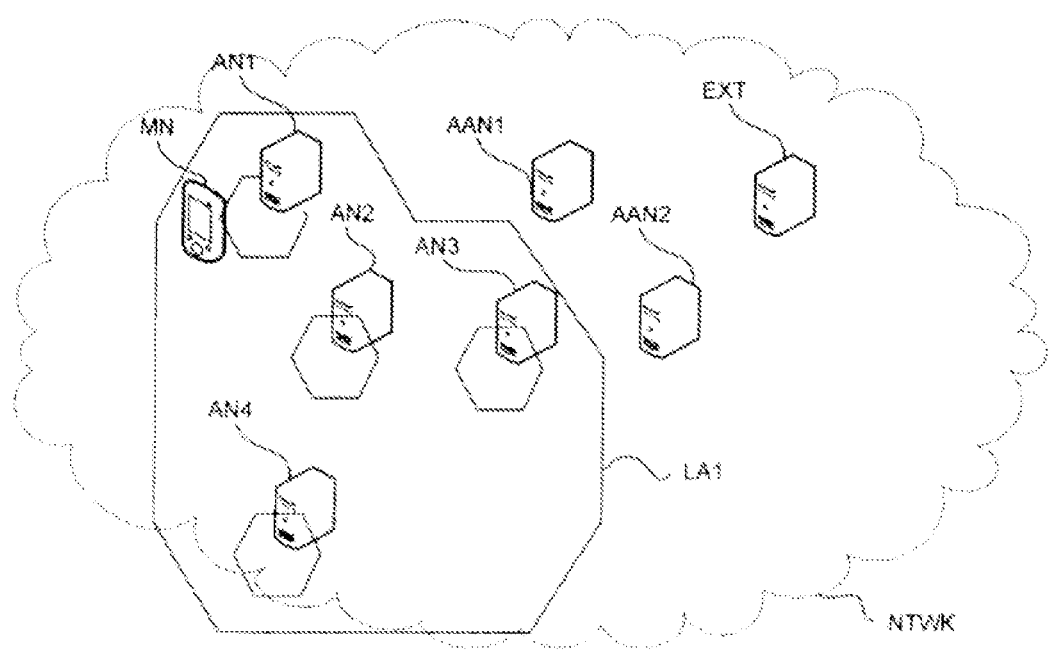
FIG. 2 illustrates an architecture of a network in a particular embodiment of the invention.
Figure 3:
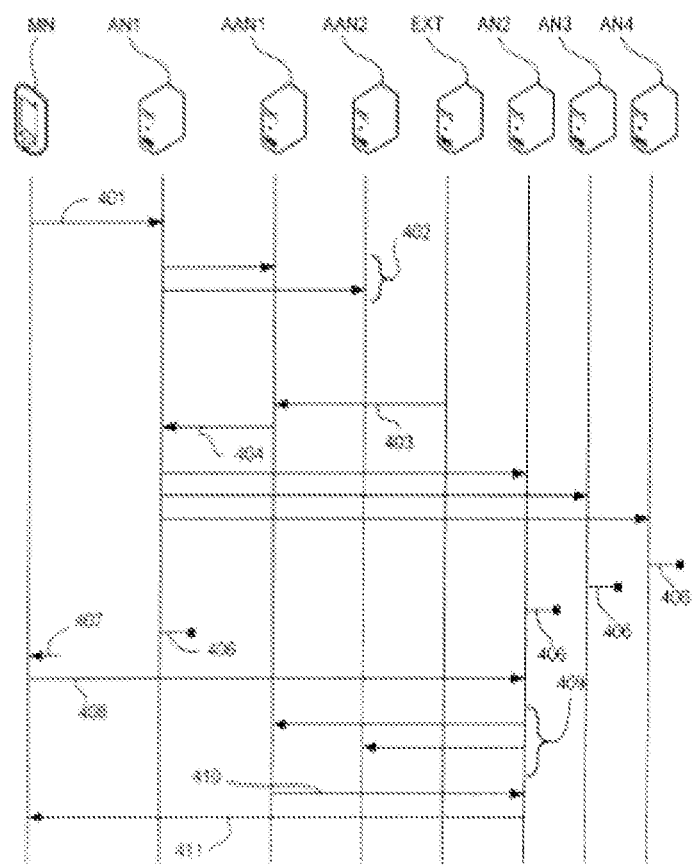
FIG. 3 describes the chaining of the steps of a particular embodiment of the invention.

An exemplary implementation of the method of an embodiment of the invention is presented in conjunction with FIGS. 2 and 3.

A terminal MN is initially active and located on the access node AN1. The access node AN1 forms part of a location zone LA1, also comprising the access nodes AN2, AN3 and AN4. The terminal MN moreover possesses two mobility anchors (AAN1 and AAN2). The access nodes and the mobility anchors (which are also access nodes, basically) form part of an access network NTWK. The mobility anchor AAN1 with which the terminal MN has registered an IP address, may receive data for the terminal MN originating from an exterior source EXT situated for example within a core network. This is also the case for the mobility anchor AAN2. The general implementation of the paging according to an embodiment of the invention is illustrated in conjunction with FIG. 3.

In a first phase, the terminal MN decides to switch from the active state to the passive state. It notifies this (401) by sending the corresponding event to its current access node (AN1). The current access node AN1 becomes the last known access node (ANp) for this terminal MN.

The event of toggling to the passive state of the terminal is propagated (402) by the current access node AN1 to the mobility anchors (AAN1 and AAN2). The corresponding contexts are updated with the new state of the mobile (AAN tables of the mobility anchors). The location context of the terminal in AN1 is deleted. The network then considers the terminal in the passive state.

This phase corresponds to the phase of placing the terminal MN on standby.

Subsequently, in a second phase, the mobility anchor AAN1 receives 403 data packets intended for the terminal MN. The mobility anchor consults its context table, determines that the terminal is in the passive mode and that the last known access node ANp is the access node AN1. It becomes the paging anchor of the terminal MN. The paging anchor AAN1 decides to initiate the paging procedure: it records in buffer memory the packets destined for the terminal MN and constructs an empty packet destined for the terminal MN.

The paging anchor AAN1 sends 404 the paging initialization packet destined for the last known access node ANp, the access node AN1. On receipt of this packet, the access node AN1 identifies that the terminal considered is not recorded in its VAN table, it therefore decides to propagate the search for the terminal in its location zone.

The access node AN1 generates 405 a paging request encapsulating the packet received from the paging anchor AAN1 to the set of access nodes of the location zone. In this example, this request is broadcast by multicast.

Each access node (AN2, AN3, AN4) receiving the paging request (as well as the access node AN1) generates 406 a search request for the terminal on its radio cell (for example by carrying out a level-2 paging or by broadcasting a request of ARP type). The paging request is made with the mobile's IP address allocated originally by the mobility anchor AAN1.

The terminal MN which moves in the location zone receives 407 the paging request, identifies that it is intended for it by decoding the IP address. It can deduce therefrom that the paging anchor is the access node AAN1. It toggles into the active state, attaching itself to the closest access node which is, for example, the access node AN2.

The terminal MN, once associated with the access node AN2, updates 408 its location with its various anchors. It can do so while prioritizing the updates destined for its paging anchor AAN1 with respect to the other anchors. On receipt 409 of the update requests, the anchor access nodes AAN1 and AAN2 record the new location of the terminal MN (in this instance the access node AN2) and its toggling to the active state. The anchor access node AAN1 is then able to transmit 410 the packets recorded in buffer memory to the new position (AN2) which retransmits them 411 to the terminal MN.

8. Other Optional Characteristics and Advantages 8.1 Timeout for Toggling to the Passive Mode According to a particular characteristic of an embodiment of the invention, the toggling of a terminal from the active state to the passive state can be done while packets are being trunked to this mobile. Indeed, during its toggling the terminal and its current access node (the ANp) can, according to an embodiment of the invention, maintain the active state during a configurable timeout making it possible to receive the data packets possibly being trunked. If such packets arrive before the expiry of the timeout, they are delivered to the terminal. It can thereafter either continue its toggling to the passive state or decide to remain active but it must then locate itself again so as to prevent its mobility anchors from considering it in the passive state.

8.2 Periodic Updates of the Contexts

When the terminal toggles from the active state to the passive state, it indicates this to the network which maintains its passive state and its tables as long as the IP addresses of the mobile remain valid. The IP addresses being invalidated automatically after a given inactivity time, the terminal must reassociate itself and locate itself with its mobility anchors before this expiry, even if it means switching back rapidly thereafter to the passive state. This mechanism makes it possible to ensure that the terminal relocates itself regularly. When the terminal determines that it can deactivate a given mobility anchor (for example once the terminal has closed all the transport sessions using a given IP address), it does not have to update its location context in the corresponding AAN. This makes it possible to delete the unused network contexts.

8.3 Prioritization of the Update Requests Subsequent to "Paging"

During the toggling to the active state subsequent to a distributed-paging request according to an embodiment of the invention, the terminal can choose to prioritize the sending of its update request destined for its paging anchor with respect to those relating to its other mobility anchors. This makes it possible to update by priority the context of the AAN table used in the paging procedure and to re-enable the transfer of the pending packets.

8.4 Paging Restricted to Certain Technologies

Provision may be made, when one of the technologies of the network provides ubiquitous coverage and is implemented on all the terminals, to restrict the location zones to the cells of this technology (UMTS for example). Thus when the terminal switches to the passive state it merely polls the paging messages of this technology. The access node ANp does not necessarily have to support this technology, the terminal could for example toggle to the passive state on a WiFi access node ANp which, thereafter, would propagate the paging requests only via UMTS access nodes without itself implementing any radio paging.

8.5 Use of SIP

As described previously, the terminal in the passive state which wishes to be able to be reached through an SIP-based signaling network must keep up to date its AAN context corresponding to the IP address recorded in the SIP servers (see periodic updating of the contexts). This IP address may change over time and the SIP mechanisms make it possible to modify it on the initiative of the terminal. A terminal in the active state is therefore able to select the IP address on which it may be reached via SIP. Once in the passive state it must however ensure that the AAN context corresponding to the recorded address remains valid. It is therefore required to locate itself regularly so as to maintain this context and prevent the associated address validity timeouts from expiring. If the terminal in the passive state wishes to modify its address registered in the SIP network, it must locate itself beforehand and toggle to the active state so as to implement the SIP update in a conventional manner (send REGISTER request to the SIP server).

The paging mechanism proposed by an embodiment of the invention therefore supplements the reachability mechanisms provided for in the SIP protocol in the case when this data transmission protocol is used.

8.6 Signaling between the Terminal and the Mobility Anchor

The paging mechanism of the invention is based, in at least one embodiment, on distributing the mobile's state update functions between the terminal, the access nodes and the mobility anchors.

In a particular embodiment, an alternative consists in establishing a direct dialog between the terminal and its mobility anchors so that the terminal informs its mobility anchors directly of its toggling to the passive mode or to the active mode in accordance with a dedicated signaling protocol. Such a solution makes it possible to avoid the requirement for the access nodes to support the propagation of the information regarding a change of state of the mobile to its mobility anchors, as was explained previously. However, it gives rise to greater signaling between the terminal and the network.

It is, however, particularly beneficial in the case where each terminal uses few mobility anchors in parallel. The exchange of signaling between a terminal and its anchor may be envisaged via the specification of a dedicated protocol or else the transport, according to an embodiment of the invention, of MIH requests based on IEEE standard 802.21 (for example the "link_down indication" primitive with a new "Reason-Code" specific to standby management, such as mentioned previously).

The mechanism for broadcasting paging requests according to an embodiment of the invention remains identical, relying on propagation via the access nodes.

9. Other Optional Characteristics and Advantages

Figure 4:
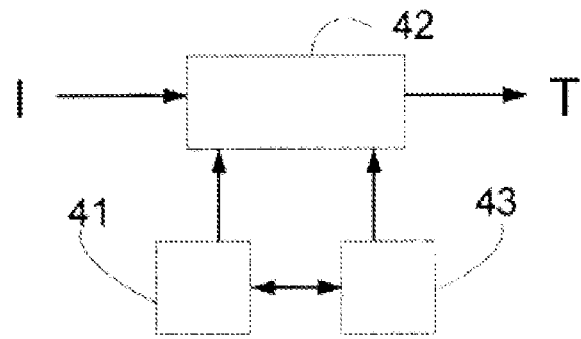
FIGS. 4, 5 and 6 describe an anchor access node, a known access node and a terminal according to an embodiment of the invention.

An embodiment of an anchor access node according to an embodiment of the invention is presented in conjunction with FIG. 4.

Such an access node comprises a memory 41 consisting of a buffer memory, a processing unit 42, equipped for example with a microprocessor, and driven by the computer program 43, implementing the activation method according to an embodiment of the invention.

On initialization, the code instructions of the computer program 43 are for example loaded into a RAM memory before being executed by the processor of the processing unit 42. The processing unit 42 receives as input at least one item of information I to be transmitted (such as data to be transmitted to the terminal). The microprocessor of the processing unit 42 implements the steps of the previously described activation method, according to the instructions of the computer program 43, so as to deliver a processed item of information T (such as a terminal activation request). Accordingly, the anchor access node comprises, in addition to the buffer memory 41, means for receiving the data to be transmitted to the communication terminal, such as network interfaces, means for identifying at least one access node to which the communication terminal was previously attached, termed the last known access node, on the basis of said datum to be transmitted and means for transmitting, to the last known access node, an activation datum destined for at least one communication interface of said terminal, making it possible to activate said terminal. These means allow in particular the execution of the method according to an embodiment of the invention. These means are driven by the microprocessor of the processing unit 42.

Figure 5:
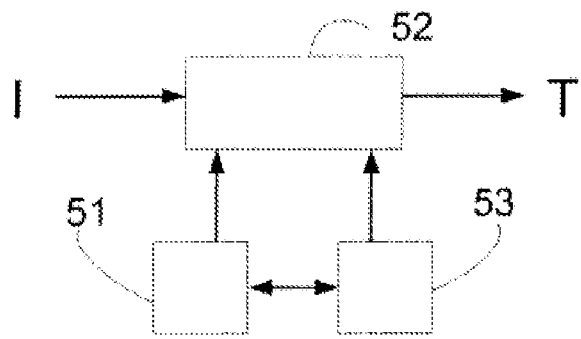

An embodiment of an access node ANp according to an embodiment of the invention is presented in conjunction with FIG. 5.

Such an access node comprises a memory 51 consisting of a buffer memory, a processing unit 52, equipped for example with a microprocessor, and driven by the computer program 53, implementing the activation method according to an embodiment of the invention.

On initialization, the code instructions of the computer program 53 are for example loaded into a RAM memory before being executed by the processor of the processing unit 52. The processing unit 52 receives as input at least one item of information I to be transmitted (such as a terminal activation request). The microprocessor of the processing unit 52 implements the steps of the previously described activation method, according to the instructions of the computer program 53, so as to deliver a processed item of information T (such as a terminal activation request to be broadcast). Accordingly, the access node ANp comprises, in addition to the buffer memory 51, means for receiving an activation datum previously transmitted by an anchor access node, means for searching, within an attachment database, for an item of information representative of a current attachment of said communication terminal, means for broadcasting at least one activation request, destined for an interface of said communication terminal within a location zone to which said access node belongs, comprising said activation datum, when said search means indicate that said terminal is not attached.

These means allow in particular the execution of the method according to an embodiment of the invention. These means are driven by the microprocessor of the processing unit 52.

Figure 6:
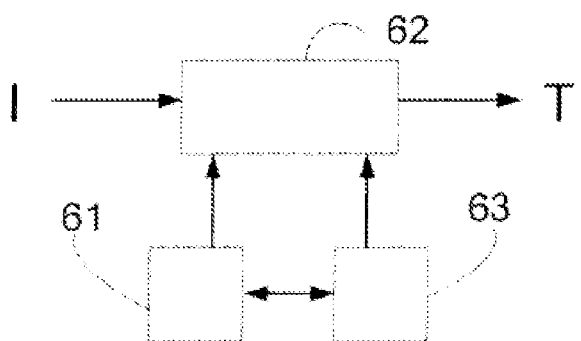

An embodiment of a terminal according to an embodiment of the invention is presented in conjunction with FIG. 6.

Such a terminal comprises a memory 61 consisting of a buffer memory, a processing unit 62, equipped for example with a microprocessor, and driven by the computer program 63, implementing the activation method according to an embodiment of the invention.

On initialization, the code instructions of the computer program 63 are for example loaded into a RAM memory before being executed by the processor of the processing unit 62. The processing unit 62 receives as input at least one item of information I to be transmitted (such as an activation request). The microprocessor of the processing unit 62 implements the steps of the previously described activation method, according to the instructions of the computer program 63, so as to deliver a processed item of information T (such as an attachment to a new access node). Accordingly, the terminal comprises, in addition to the buffer memory 61, means for receiving, by way of at least one communication interface, an activation datum broadcast by an access node ANp, means for verifying that said activation datum received is intended for it and means for activating, when said activation datum received is intended for the terminal.

These means allow in particular the execution of the method according to an embodiment of the invention. These means are driven by the microprocessor of the processing unit 62.

The invention claimed is:

1. A method comprising:
   activating a communication terminal comprising several communication interfaces corresponding to different communication technologies, said terminal being situated in a wireless communication network comprising a plurality of access nodes which implement different communication technologies, wherein activating comprises:
   receiving, by an access node of said communication network with which the terminal has performed an OSI level-2 attachment, termed an anchor access node, at least one datum to be transmitted to said communication terminal, wherein the terminal has previously obtained an IP address from the anchor access node;
   identifying, by said anchor access node, at least one access node to which said communication terminal was previously attached, termed a last known access node, on the basis of said datum to be transmitted; and
   transmitting, by said anchor access node to said at least one last known access node, at least one activation datum comprising the IP address and destined for at least one communication interface of said terminal, making it possible to activate said terminal.

2. The method as claimed in claim 1, wherein identifying said at least one last known access node comprises:
   obtaining an activation context of said communication terminal;
   and when said context indicates that said terminal is inactive:
   recording in said anchor access node said at least one datum to be transmitted to said terminal; and
   searching, within an attachment database, for said at least one last known access node.

3. The method of claim 1, wherein the method comprises the following acts executed before identifying the at least one access node:
   processing at least one datum representative of a change of state of a communication terminal, wherein processing comprises:
   on receiving said at least one datum representative of the change of state of said terminal originating from at least one current access node to which said terminal is attached;
   storing at least one datum for identifying said at least one current access node; and
   associating at least one identifier of said terminal with said datum for identifying said at least one current access node, delivering a datum representative of the last known access node for said communication terminal.

4. An anchor access node of a wireless communication network comprising a plurality of access nodes which implement different communication technologies, said anchor access node, comprising:
   means for receiving at least one datum to be transmitted to a communication terminal situated in the wireless communication network and having performed an OSI level-2 attachment with the anchor access node, said terminal comprising several communication interfaces corresponding to different communication technologies;
   means for identifying at least one access node to which said communication terminal was previously attached, termed a last known access node, on the basis of said datum to be transmitted; and
   means for transmitting, to said at least one last known access node, at least one activation datum comprising an IP address that the terminal has previously obtained from the anchor access node and destined for at least one communication interface of said terminal, making it possible to activate said terminal.

5. A computer-readable medium device comprising a computer program stored thereon and comprising program code instructions for implementing a method for activating a communication terminal comprising several communication interfaces corresponding to different communication technologies, said terminal being situated in a wireless communication network comprising a plurality of access nodes which implement different communication technologies, when this program is executed by a processor, wherein the method comprises:

receiving, by an access node of said communication network with which the terminal has performed an OSI level-2 attachment, termed an anchor access node, at least one datum to be transmitted to said communication terminal, wherein the terminal has previously obtained an IP address from the anchor access node;

identifying, by said anchor access node, at least one access node to which said communication terminal was previously attached, termed a last known access node, on the basis of said datum to be transmitted; and transmitting, by said anchor access node to said at least one last known access node, at least one activation datum comprising the IP address and destined for at least one communication interface of said terminal, making it possible to activate said terminal.

6. A method for broadcasting a datum for activating a communication terminal situated in a wireless communication network, wherein the method comprises:

receiving, within an access node, termed a last known access node, said activation datum originating from an access node of said communication network with which the terminal has performed an OSI level-2 attachment, termed an anchor access node, from which the terminal has previously obtained an IP address and having previously received at least one datum to be transmitted to said communication terminal, wherein the activation datum comprises the IP address;

searching, within an attachment database by the access node termed the last known access node, for an item of information representative of a current attachment of said communication terminal, wherein said communication terminal comprises several communication interfaces corresponding to different communication technologies and the wireless communication network comprises a plurality of access nodes which implement different communication technologies; and broadcasting, by the access node termed the last known access node, at least one activation request comprising said activation datum, in a location zone in which said terminal is situated, when said searching indicates that said terminal is not attached to said last known access node.

7. The broadcasting method as claimed in claim 6, wherein said broadcasting comprises transmitting an activation request in respect of said terminal destined for at least one access node of said location zone with which said last known access node is connected.

8. The method of claim 6, wherein the method further comprises: transmitting a notification for deactivating the communication terminal, wherein deactivating comprises:

receiving, by a current access node to which said terminal is attached, a deactivation notification;

transmitting, by said at least one current access node, to the anchor access node, at least one datum representative of the change of state of said terminal; and deleting the attachment of said terminal within said at least one current access node.

9. An access node of a wireless communication network comprising a plurality of access nodes which implement different communication technologies, said access node being referred to as a last known access node, wherein the access node comprises:

means for receiving at least one activation datum originating from another access node of said communication network with which a communication terminal situated within said wireless communication network has performed an OSI level-2 attachment, said terminal comprising several communication interfaces corresponding to different communication technologies, said other access node being termed an anchor access node, having previously received at least one datum to be transmitted to the communication terminal, wherein the activation datum comprises an IP address that the terminal previously received from the anchor access node;

means for searching, within an attachment database, for an item of information representative of a current attachment of said communication terminal; and means for broadcasting at least one activation request comprising said activation datum, in a location zone in which said terminal is situated, when said searching indicates that said terminal is not attached to said access node.

10. A computer-readable medium device comprising a computer program stored thereon and comprising program code instructions for implementing a method for broadcasting a datum for activating a communication terminal, said terminal being situated in a wireless communication network comprising a plurality of access nodes which implement different communication technologies, when this program is executed by a processor, wherein the method comprises:

receiving, within an access node, termed a last known access node, said activation datum originating from an access node of said communication network with which the terminal has performed an OSI level-2 attachment, termed an anchor access node, having previously received at least one datum to be transmitted to said communication terminal, wherein the activation datum comprises an IP address that the terminal has previously received from the anchor access node;

searching, within an attachment database, for an item of information representative of a current attachment of said communication terminal, said communication terminal comprising several communication interfaces corresponding to different communication technologies; and broadcasting at least one activation request comprising said activation datum, in a location zone in which said terminal is situated, when said searching indicates that said terminal is not attached to said last known access node.

\* \* \* \* \*